United States Patent [19]

Ejiri et al.

[11] Patent Number: 5,176,955
[45] Date of Patent: Jan. 5, 1993

[54] MAGNETIC RECORDING MEDIUM COMPRISING FERROMAGNETIC POWDER HAVING A PH OF AT LEAST 7 DISPERSED IN A VINYL CHLORIDE COPOLYMER USING AN AROMATIC PHOSHORIC, PHOSPHONIC OR SULFONIC ACID DISPERSANT

[75] Inventors: Kiyomi Ejiri; Hiroaki Araki; Hiroshi Hashimoto, all of Kanagawa, Japan

[73] Assignee: Fuji Photo Film Co., Ltd., Kanagawa, Japan

[21] Appl. No.: 687,133

[22] Filed: Apr. 18, 1991

[30] Foreign Application Priority Data

Apr. 19, 1990 [JP] Japan .................................. 2-101567

[51] Int. Cl.$^5$ .............................................. G11B 5/00
[52] U.S. Cl. ......... .......................... 428/336; 428/424.6; 428/425.8; 428/425.9; 428/694; 428/900; 427/128; 427/130
[58] Field of Search ..................... 428/694, 900, 425.9, 428/425.8, 424.6, 336, 522; 427/128, 130

[56] References Cited

U.S. PATENT DOCUMENTS

| | | | |
|---|---|---|---|
| 4,282,141 | 8/1981 | Minagawa et al. | 260/45.7 R |
| 4,600,521 | 7/1986 | Nakamura et al. | 252/62.54 |
| 4,602,264 | 7/1986 | Shioi et al. | 346/205 |
| 4,707,410 | 11/1987 | Hata et al. | 428/413 |
| 4,743,501 | 5/1988 | Eguchi et al. | 428/328 |
| 4,748,084 | 5/1988 | Hata et al. | 428/425.9 |
| 4,885,208 | 12/1989 | Araki et al. | 428/403 |

FOREIGN PATENT DOCUMENTS 61-158023  7/1986  Japan .
62-134819  6/1987  Japan .
1-189025   7/1989  Japan .

Primary Examiner—P. C. Sluby
Assistant Examiner—Stevan A. Resan
Attorney, Agent, or Firm—Sughrue, Mion, Zinn, Macpeak & Seas

[57] ABSTRACT

A magnetic recording medium improved in electromagnetic characteristics, running durability and running properties is disclosed, comprising a non-magnetic support and at least one magnetic layer formed thereon, said magnetic layer having a ferromagnetic powder dispersed in a binder, wherein said magnetic layer contains at least one member selected from the group consisting of an aromatic phosphoric acid or a derivative thereof, an aromatic phosphonic acid or a derivative thereof, and an aromatic sulfonic acid or a derivative thereof, and wherein said ferromagnetic powder has a pH of at least 7, and said binder is a vinyl chloride copolymer having an epoxy group and a hydroxyl group attached to an alkyl chain group. Also, a method for producing a magnetic recording medium is disclosed which comprises the steps of kneading and dispersing a ferromagnetic powder having a pH of at least 7, at least one member selected from the group consisting of an aromatic phosphoric acid or a derivative thereof, an aromatic phosphonic acid or a derivative thereof, and an aromatic sulfonic acid or a derivative thereof, and a vinyl chloride copolymer having an epoxy group and a hydroxyl group attached to an alkyl chain group, together with a solvent; and then optionally adding at least one additive thereto, and mixing to prepare a magnetic coating; and then applying the resulting magnetic coating to a non-magnetic support; drying, calendering and then heat treating.

15 Claims, No Drawings

MAGNETIC RECORDING MEDIUM COMPRISING FERROMAGNETIC POWDER HAVING A PH OF AT LEAST 7 DISPERSED IN A VINYL CHLORIDE COPOLYMER USING AN AROMATIC PHOSHORIC, PHOSPHONIC OR SULFONIC ACID DISPERSANT

FIELD OF THE INVENTION

The present invention relates to a magnetic recording medium having good electromagnetic characteristics, running durability and running properties, and to a method for producing the magnetic recording medium including a heat treatment step performed over a short period of time.

BACKGROUND OF THE INVENTION

Magnetic recording media are widely used in various applications such as recording tapes, video tapes, floppy disks and the like. The magnetic recording medium basically comprises a non-magnetic support and magnetic layers formed thereon, the magnetic layers containing a ferromagnetic powder dispersed in a binder.

Given their intended applications, the magnetic recording media necessarily must be well-developed in levels of performance characteristics such as electromagnetic characteristics, running durability and running properties. In particular, with the recent popularization of 8-mm video tape recorders, the video tapes must be high in video output and have excellent ability to reproduce original images, and must also display excellent electromagnetic characteristics in general.

Various methods for improving the electromagnetic characteristics of the magnetic recording media are known including methods involving direct manipulation of the characteristics of the ferromagnetic powder. For instance, the ferromagnetic powders are gradually pulverized to a greater extent so that higher density recording is possible, and, as another approach, the raw materials for the ferromagnetic powders are also shifted from iron oxide to iron oxide modified with a diverse metal such as cobalt. Further, ferromagnetic metals such as iron, nickel and cobalt or alloys containing these elements have recently come into use.

By using the above conventional methods to improve ferromagnetic powders, magnetic recording media having good electromagnetic characteristics can be theoretically obtained. In actual practice, however, it is difficult to produce magnetic recording media which are improved in electromagnetic characteristics to a degree commensurate to any improvement provided in the ferromagnetic powder itself. This lack of carryover in improvement is due to the following reason. Namely, the dispersibility of the ferromagnetic powder into the binder tends to decrease as the ferromagnetic powder is more extensively pulverized, and also as a function of the type of ferromagnetic powder used. For example, the dispersibility tends to decrease in order of γ-iron oxide, γ-iron oxide coated with cobalt and ferromagnetic metal powders. Consequently, the situation is occasionally encountered wherein the dispersed state of the ferromagnetic powder in the magnetic layer is deteriorated in manner conversely to the improvement of the ferromagnetic powder, so that the excellent characteristics of the ferromagnetic powder itself are not fully exhibited in the finished magnetic recording medium.

In order to improve the dispersed condition of the ferromagnetic powder in a binder, a method is also known in which dispersion by kneading is performed for a prolonged period of time in preparing a magnetic layer. However, considerable shear stresses act on the ferromagnetic powder during such dispersion by kneading, so that adverse effects due to this shearing action are correspondingly increased with prolongation of such kneading time. For this reason, the characteristics of the ferromagnetic powder are sometimes lost when such kneading is used. In addition, the problem of diminished working efficiency is encountered due to the requirement of an extended period of time required for the production of the magnetic recording medium.

Due to above state of affairs, methods for effectively dispersing the ferromagnetic powder as described above without significantly changing typical manufacturing methods for producing the magnetic recording media have been studied. Such methods include a method of using ferromagnetic powders surface treated with surface treating agents such as silane coupling agents, a method of pretreating ferromagnetic powders with components for improving the dispersibility of the ferromagnetic powders (dispersing agents) such as fatty acids (JP-B-54-7074, the term "JP-B" as used herein means an "examined Japanese patent publication"), and the method of adding the above-described fatty acids to the ferromagnetic powders during production.

However, studies by the present inventors have revealed that the dispersed state of the ferromagnetic powders was not fully improved in all cases even if the above-described methods were employed.

For example, the ferromagnetic powders surface treated by using the above-described silane coupling agents are usually improved in their stability of the dispersed state in the magnetic layers, but with the drawback that compatibility with resin components sometimes decreases. Therefore, the dispersed state of the ferromagnetic powders in the magnetic layers is not fully improved in all cases.

The above-mentioned fatty acids usually contained in the magnetic layers of the magnetic recording media as lubricating agents also can have dispersing action on the ferromagnetic powders. However, when the fatty acids are specifically used as a dispersing agent, sufficient dispersing effect can not be obtained without using the fatty acids in relatively larger amounts than if the fatty acids were compounded in the magnetic layers as the lubricating agent instead. The use of such large amounts of fatty acids causes the problem of plasticizing the binders.

On the other hand, the surface smoothness of the magnetic layers is also improved with the improvement of the dispersibility of the ferromagnetic powders by the methods as described above. For this reason, the coefficient of friction of the magnetic layer surfaces increases, which results in a tendency of the magnetic layer to deteriorate in running properties and running durability.

JP-A-63-42025 (the term "JP-A" as used herein means an "unexamined published Japanese patent application") discloses the magnetic recording media containing benzoic acid and salts thereof as dispersing agents which can prevent the plasticization of the binders induced when the above-described fatty acids are used. As to these magnetic recording media, the dispersibility and the plasticization of the binders are satisfactory, but the running properties and running durability are not completely satisfactory.

In order to address the above shortcomings of the conventional methods, the present inventors have already proposed to add organic phosphorus compounds such as phosphoric acid substituted by an alkyl or aryl group and salts thereof to the magnetic layers (JP-A-1-189025). The dispersibility of the ferromagnetic powders is significantly improved by this proposal, and the electromagnetic characteristics and the running durability are also improved thereby.

In some cases, however, even these improvements in properties are not necessarily sufficient under severe conditions such as the circumstances of high temperature and high humidity.

Further, JP-A-62-134819 discloses a magnetic recording media exhibiting excellent running durability and having excellent electromagnetic characteristics such as high S/N ratio. This media are obtained with binders containing vinyl chloride, a hydroxyl group-containing monomer and a polar group-containing monomer or copolymers containing vinyl chloride, vinyl acetate, a hydroxyl group-containing monomer and a polar group-containing monomer as constituting units. Further, the hydroxyl groups of this hydroxyl group-containing monomer are not directly combined with the vinyl groups and 50 to 95% by weight of the polar groups are epoxy groups. These binders improve the electromagnetic characteristics of the magnetic recording media.

However, the magnetic recording media obtained by this method are also insufficient in running durability and unsatisfactory in electromagnetic characteristics such as their maximum output level and sensitivity.

Also, the magnetic recording media are known in which vinyl chloride resins having epoxy groups are used as binders (JP-A-62-175928 and JP-A-63-166010), but these media also have problems in durability, for example.

SUMMARY OF THE INVENTION

An object of the present invention is to provide a magnetic recording medium satisfactory in electromagnetic characteristics, particularly in C/N ratio, in running durability, particularly in running durability under the circumstances of high temperature and high humidity, and in running properties, and a method for producing the same.

The above-described object can be attained by the present invention hereinafter described.

Namely, the present invention provides for (1) a magnetic recording medium comprising a non-magnetic support and at least one magnetic layer formed thereon, said magnetic layer having a ferromagnetic powder dispersed in a binder, wherein said magnetic layer contains at least one member selected from the group consisting of an aromatic phosphoric acid or a derivative thereof, an aromatic phosphonic acid or a derivative thereof, and an aromatic sulfonic acid or a derivative thereof, and wherein said ferromagnetic powder has a pH of at least 7, and said binder is a vinyl chloride copolymer having an epoxy group and a hydroxyl group attached to an alkyl chain group; and (2) a method for producing a magnetic recording medium which comprises the steps of kneading and dispersing a ferromagnetic powder having a pH of at least 7, at least one member selected from the group consisting of an aromatic phosphoric acid or a derivative thereof, an aromatic phosphonic acid or a derivative thereof, and an aromatic sulfonic acid or a derivative thereof, and a vinyl chloride copolymer having an epoxy group and a hydroxyl group attached to an alkyl chain group, together with a solvent, and then optionally adding at least one additive thereto, and mixing to prepare a magnetic coating, applying the resulting magnetic coating to a non-magnetic support, drying the coating applied to the non-magnetic support, and thereafter subjecting the coating to a calender treatment, and then heat treating at 50° to 90° C. within 30 hours.

More preferably, the above-described object of the present invention can be attained even more satisfactorily by using the above-described binder as further containing a polyurethane having a glass transition temperature (Tg) of from 25° to 65° C.

DETAILED DESCRIPTION OF THE INVENTION

In the present invention, the acidic group of an aromatic phosphoric acid, an aromatic phosphonic acid, an aromatic sulfonic acid or a derivative thereof is strongly ion-adsorbed by ferromagnetic powder having a pH of at least 7, i.e., alkaline ferromagnetic powder. Also, the aromatic ring moiety of the above-described aromatic phosphoric acid, aromatic phosphonic acid, aromatic sulfonic acid or a derivative thereof has lipophilic properties, so that the aromatic ring moiety has high affinity with the binder, specifically with a vinyl chloride copolymer for example. Since the ferromagnetic powder strongly adsorbs the above-described aromatic phosphoric acid, aromatic phosphonic acid, aromatic sulfonic acid or a derivative thereof, the ferromagnetic powder itself will have the lipophilic aromatic ring disposed on its surface. As a result, the ferromagnetic powder is therefore well-dispersed in the binder such as a vinyl chloride copolymer. Thus, the dispersibility of the ferromagnetic powder is improved; thereby improving the C/N of the magnetic recording medium.

The mechanical characteristics of the magnetic layer are improved by the intermolecular force between the above-described aromatic ring-containing acids and the binder, and also by reaction between an -OH group attached to an alkyl chain group and an epoxy group on different binder molecules during heat treatment. As a result of these reactions, the resistance to clogging under conditions of high temperature and high humidity (40° C., 80% RH) and the still properties under the circumstances of high temperature and high humidity are improved. The —OH group present through the alkyl chain of the binder molecule is extremely high in reactivity, so that hardening proceeds to completion. Therefore, the mechanical properties are not lost even under the circumstances of high temperature and high humidity. The aromatic phosphoric acid, aromatic phosphonic acid, aromatic sulfonic acid and derivatives thereof promote the reaction of the epoxy group with the —OH group of the binder. Consequently, the hardening of the binder is promoted which provides an improvement in the mechanical characteristics. This polymerization promoting action is useful because the crosslinking is accelerated and can be accomplished in a short period of time by heating the magnetic recording medium at 50° C. or more, preferably at 50° to 90° C. after performing the steps of coating the magnetic layer, drying and calender treatment.

Further, when a polyurethane having a glass transition temperature (Tg) of 25 to 65° C. is used in combination with the vinyl chloride copolymer, the toughness and the breaking elongation of the magnetic layer are improved.

In the present invention, ferromagnetic metal powders mainly containing Fe and Ni are preferably used as the ferromagnetic powders having a pH of at least 7. The content of Ni in the ferromagnetic metal powder is preferably 0.1 to 20 atom %, more preferably 0.1 to 15 atom % to the Fe content. These ferromagnetic powders may also contain known impurities such as Co, Cr, Zn and alkaline earth metals depending on their purpose. Ferromagnetic powders such as γ-iron oxide and Co-containing γ-iron oxide can also be used.

The pH of the ferromagnetic powders vary due to manufacturing conditions. Thus, in order to obtain the ferromagnetic powders having a pH of at least 7, therefore, any of the following various methods can be used to adjust the pH.

(1) When the pH varies with a change in the surface state of a magnetic material due to a sintering inhibitor such as Al or Si in sintering, the sintering inhibitor and/or sintering conditions are appropriately selected.

(2) The conditions of a stabilizing treatment which is conducted in an organic solvent or in a gas phase within a certain degree of partial pressure of oxygen are appropriately manipulated.

(3) An alkali treatment is performed on the ferromagnetic powders.

As to the characteristics of the ferromagnetic powders used in the present invention, in order to obtain highly efficient magnetic recording media, it is preferred that the specific surface area (SSA) is 40 m²/g or more, and preferably to 70 m²/g, and that the saturation magnetization ($\sigma_s$) is 115 emu/g or more, and particularly 115 to 145 emu/g. The coercive force (Hc) thereof is determined according to the ultimate intended use of the magnetic recording media.

The aromatic phosphoric acids, the aromatic phosphonic acids, the aromatic sulfonic acids and the derivatives thereof are represented by the following general formulae:

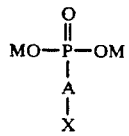  (I)

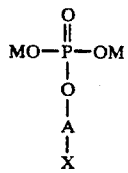  (II)

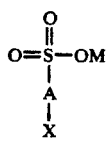  (III)

wherein A represent an aromatic ring such as a benzene ring or a naphthalene ring; X represents a substituent group such as a hydrogen atom, an alkyl group having 1 to 20 carbon atoms, preferably 1 to 10 carbon atoms (for example, methyl), a nitro group or a halogen atom (for example, chlorine); and M represents a hydrogen atom or a metal such as an alkali metal (for example, K, Na) or an alkaline earth metal (for example, Ca, Mg). A is preferably a benzene ring (for example, a phenyl group). X is preferably a hydrogen atom, a methyl group and an ethyl group. M is preferably a hydrogen atom, K and Na.

Specific examples of the compounds represented by the above-described general formulae (I), (II) and (III) are shown below.

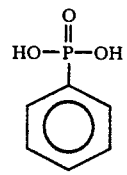  I-1

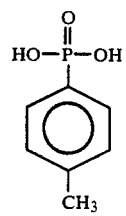  I-2

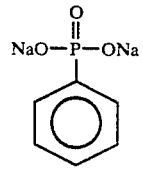  I-3

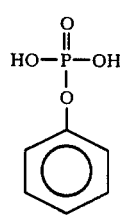  II-1

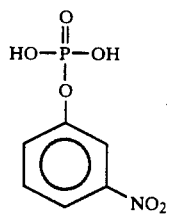  II-2

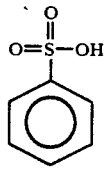  III-1

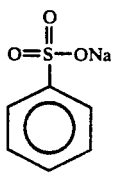  III-2

The aromatic phosphoric acid, aromatic phosphonic acid, aromatic sulfonic acid or derivatives thereof are added to the magnetic layer in an amount of 0.1 to 10.0% by weight based on the ferromagnetic powder in the magnetic layer, preferably in an amount of 0.1 to 6.0% by weight. The vinyl chloride copolymers having the —OH groups attached to the alkyl chain group and epoxy groups have an average degree of polymerization (Pn) of 200 to 500, and preferably 250 to 450. In these vinyl chloride copolymers, the epoxy groups may be attached to main chains directly or through the alkyl chain groups, but the latter is preferably used. The alkyl chain group intervening between an epoxy group and main chain and the alkyl chain group intervening between the —OH group and the main chain have 2 to 30 carbon atoms. Alkyl chain groups having 2 to 15 carbon atoms are preferably used. The amount of the epoxy groups contained in the above-described vinyl chloride copolymers is $1\times10^{-5}$ to $5\times10^{-3}$ eq/g, and preferably $4\times10^{-5}$ to $2\times10^{-3}$ eq/g. Further, the amount of the —OH groups contained in the above-described vinyl chloride copolymers is $1\times10^{-5}$ to $5\times10^{-3}$ eq/g, and preferably $4\times10^{-5}$ to $2\times10^{-3}$ eq/g.

The above-described vinyl chloride copolymer can be produced, for example, by copolymerizing a vinyl chloride monomer, an epoxy group-containing monomer and a hydroxyl group-containing monomer.

When a monomer having both a reactive double bond and an epoxy group is used to introduce the epoxy group as described above, glycidyl (meth)acrylate is usually employed. Examples of compounds which can be used to introduce the epoxy group other than glycidyl (meth)acrylate include the following compounds:

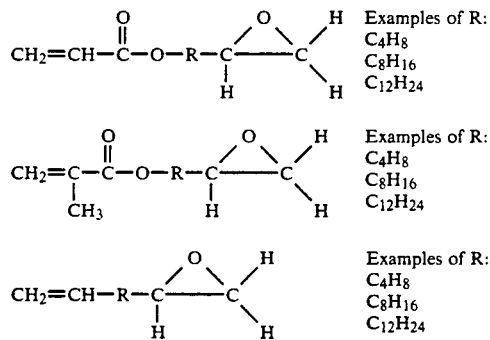

In order to introduce the hydroxyl group into the above-described vinyl chloride copolymer, a hydroxyl group-containing monomer, namely a monomer having a reactive double bond and also a hydroxyl group bonded to an alkyl chain group R, is used. Examples thereof include the following compounds:

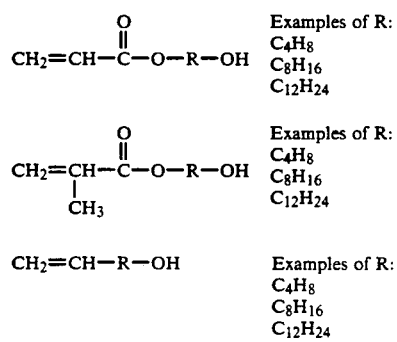

The vinyl chloride monomer may also have the above-described epoxy group or hydroxyl group attached to the alkyl chain group.

A polar group such as a sulfo group or a carboxyl group can also be introduced in the above-described vinyl chloride copolymer. In that instance, a monomer having the polar group and a reactive double bond is added in addition to the above-described monomers and copolymerization is conducted according to conventional techniques, whereby the vinyl chloride copolymer containing the polar group can be produced. Examples of such monomers include 2-(meth)acrylamido-2-methylpropanesulfonic acid, vinylsulfonic acid and alkali metal salts thereof, (meth)acrylic acid-2- sulfonic ethyl and alkali metal salts thereof, maleic anhydride, (meth)acrylic acid and (meth)acrylic acid-2-phosphoric ester.

The above-described vinyl chloride copolymer can have the epoxy group and the hydroxyl group attached to the alkyl chain group by copolymerization of well-known monomers such as vinyl acetate. Examples of such copolymers include vinyl chloride-vinyl acetate copolymers, vinyl chloride-vinyl acetate-maleic acid copolymers, vinyl chloride-vinyl acetate-vinyl alcohol copolymers, vinyl chloride-vinyl acetate-maleic acid-vinyl alcohol copolymers, vinyl chloride-vinyl propionate-maleic acid copolymers, vinyl chloride-vinyl propionate-vinyl alcohol copolymers, vinyl chloride-vinyl acetate-acrylic acid copolymers and vinyl chloride-vinyl acetate-acrylic acid-vinyl alcohol copolymers.

The polyurethanes having a glass transition temperature (Tg) of 25° to 65° C. which can be included in the binders in the present invention have a weight-average molecular weight of 20,000 to 60,000, and preferably 30,000 to 50,000. These polyurethanes may also contain sulfonic acid (salt) groups, phosphoric acid (salt) groups and/or carboxylic acid (salt) groups, and it is preferred to do so. The toughness and the breaking elongation of the magnetic layers are improved by adding these polyurethanes to the binders.

As the above-described polyurethanes, polyurethanes produced from polyols, diisocyanates and further chain extenders as required by methods known in the art as disclosed in U.S. Pat. No. 4,7814,914 can be used.

Examples of the above-described polyols include compounds such as polyetherdiols, polyesterdiols, polycarbonatediols and polycaprolactonediols.

Typical examples of the above-described polyetherpolyols include polyalkylene glycols such as polyethylene glycol and polypropylene glycol.

The above-described polyesterpolyols can be synthesized, for example, by polycondensation of dihydric alcohols and dibasic acids or by ring-opening polymerization of lactones such as caprolactone. Typical examples of the dihydric alcohols include glycols such as ethylene glycol, propylene glycol, butanediol, 1,6-hexanediol and cyclohexanedimethanol. Typical examples of the dibasic acids include adipic acid, pimelic acid, azelaic acid, sebacic acid, phthalic acid and terephthalic acid.

Furthermore, the polycarbonatepolyols include, for example, polycarbonatepolyols having a weight-average molecular weight of 300 to 20,000 and a hydroxyl value of 20 to 300, which are synthesized by condensation or ester interchange of polyhydric alcohols represented by the following general formula (IV) and phosgene, chloroformic esters, dialkyl carbonates or diaryl carbonates:

$$\text{HO—R}^1\text{—OH} \qquad (\text{IV})$$

wherein R represents, for example, —(CH$_2$)$_n$— (n is 3 to 14),

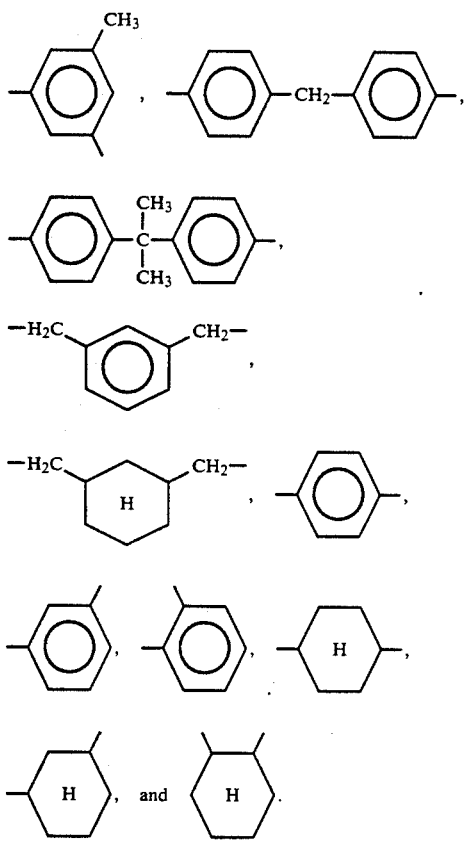

Other suitable polycarbonate polyols include polycarbonate polyesterpolyols having a weight-average molecular weight of 400 to 30,000 and a hydroxyl value of 5 to 300, which are obtained by condensation of the above-described polycarbonatepolyols with divalent carboxylic acids represented by the following general formula (V):

$$\text{HOOC—R}^2\text{COOH} \qquad (\text{V})$$

wherein R$^2$ represents an alkylene group having 3 to 6 carbon atoms, a 1,4-, 1,3- or 1,2-phenylene group, or a 1,4-, 1,3- or 1,2-cyclohexylene group.

Other polyols such as polyetherpolyols and polyesterpolyols or polyesters may be used in combination with any of the above-described polyols in an amount of not more than 90% by weight of the above-described polyols.

The polyisocyanates which are used to form polyurethanes by reaction with the above polyols are not particularly limited. Polyisocyanates that are usually employed can be used in the present invention. Examples of such polyisocyanates include hexamethylene diisocyanate, tolidine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylenediisocyanate, 4,4-diphenylmethane diisocyanate, 3,3-dimethylphenylene diisocyanate and dicyclohexylmethane diisocyanate.

Suitable chain extenders include, for example, the above-described polyhydric alcohols, aliphatic polyamines, alicyclic polyamines and aromatic polyamines.

The above-described polyurethanes may contain polar groups such as —COOM', —SO$_3$M', —PO$_3$M' and —OM' (wherein M' represents a hydrogen atom, sodium or potassium).

The above-described binder may further contain a compound having at least two isocyanate groups (polyisocyanate). Examples of such polyisocyanates include isocyanates such as tolylene diisocyanate 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates with polyalcohols; and polyisocyanates formed by condensation of these isocyanates. The above-described polyisocyanates are commercially available, for example, under the trade names of Coronate L, Coronate HL, Coronate H, Coronate EH, Coronate 2030, Coronate 2031, Coronate 2036, Coronate 3015, Coronate 3041, Coronate 2014, Millionate MR, Millionate MTL, Daltosec 1350, Daltosec 2170 and Daltosec 2280 (manufactured by Nippon Polyurethane Co., Ltd.); Takenate D-102, Takenate D-110N, Takenate D-200 and Takenate D-202 (manufactured by Takeda Chemical Industries, Ltd.); Sumidule N75 (manufactured by Sumitomo Bayer Co., Ltd.); Desmodule L, Desmodule IL, Desmodule N and Desmodule HL (manufactured by Bayer, West Germany); and Burnock D850 and Burnock D802 (manufactured by Dainippon Ink and Chemicals, Inc.).

The compounding ratio of the above-described binder to the ferromagnetic powder in the magnetic layer of the magnetic recording medium of the present invention is preferably 10 to 30 parts by weight, more preferably 15 to 25 parts by weight, per 100 parts by weight of the ferromagnetic powder.

The magnetic layers of the magnetic recording media of the present invention can contain other various additives such as carbon black, fillers, abrasive materials, dispersing agents, antistatic agents and lubricating agents, in addition to the above-described ferromagnetic powders, binders, aromatic phosphoric acids and the like. It is preferred that the content of such various additives is lower than that of the binders.

As the above-described carbon black, conventional carbon black such as furnace black, black for coloring and acetylene black can be used. Carbon black having a surface which is partly grafted by a monomer or polymer also may be used. It is preferred to use carbon black having an average particle size of about 30 to 1,000 m$\mu$. Fine-grained carbon black may be used in combination with coarse-grained carbon black.

There is no restriction on the above-described fillers. For example, granular fillers having average particle sizes ranging from 0.01 to 0.8 $\mu$m, preferably from 0.06 to 0.4 $\mu$m, can be used which is conventional practice. Examples of such fillers include particles of tungsten disulfide, calcium carbonate, titanium dioxide, magnesium oxide, zinc oxide, calcium oxide, lithopone and talc. These fillers can be used alone or in combination.

From the viewpoint of the durability of the magnetic layers of the magnetic recording media, typical examples of the abrasive materials include α-alumina, fused alumina, silicon carbide, chromium oxide, cerium oxide, corundum, artificial diamond, α-iron oxide, garnet, emery (main components: corundum and magnetite), silica, silicon nitride, boron nitride, molybdenum carbide, boron carbide, tungsten carbide, titanium carbide, tripoli, diatomaceous earth and dolomite. In particular, it is preferred to use one to four different kinds of abrasive materials having a Mohs' hardness of at least 6 in combination.

The average particle size of the abrasive materials is preferably 0.005 to 5 μm, and particularly 0.05 to 2 μm.

Suitable dispersing agent additives include conventional dispersing agents such as fatty acids having 9 to 22 carbon atoms (such as caprylic acid, capric acid, lauric acid, myristic acid, palmitic acid, stearic acid, oleic acid, elaidic acid, linolic acid, linolenic acid and stearolic acid), metallic soaps composed of the above-described fatty acids and alkali metals (such as lithium, sodium and potassium) or alkaline earth metals (such as magnesium, calcium and barium), esters of the above-described fatty acids, compounds obtained by replacing the hydrogen atoms of esters of the above-described fatty acids partly or wholly with fluorine atoms, amides of the above-described fatty acids, aliphatic amines, higher alcohols, polyalkylene oxide alkyl phosphates, alkyl phosphates, alkyl borates, sarcosinates, alkyl ether esters, trialkyl-polyolefinoxy quaternary ammonium salts and lecithin. The dispersing agent additive is usually used in an amount of 0.05 to 20 parts by weight per 100 parts by weight of the binder.

The antistatic agents include conductive fine powders such as carbon black graft polymers; natural surface active agents such as saponin; nonionic surface active agents such as alkylene oxide series surface active agents, glycerol series surface active agents and glycidol series surface active agents; cationic surface active agents such as higher alkylamines, quaternary ammonium salts, salts of heterocyclic compounds such as pyridine, phosphoniums and sulfoniums; anionic surface active agents containing acid groups such as carboxyl groups, sulfonic groups, phosphoric groups, sulfate groups and phosphate groups; and amphoteric surface active agents such as amino acids, aminosulfonic acids and sulfates or phosphates of aminoalcohols. When the above-described conductive fine powder is used as the antistatic agent, it is used, for example, in an amount of 0.2 to 20 parts by weight per 100 parts by weight of the binder. When one of the above surface active agents is used, it is used in an amount of 0.1 to 10 parts by weight.

The lubricating agents include conventional lubricating agents such as silicone oil, fine graphite powders, fine molybdenum disulfide powders and fine Teflon powders, and lubricating agents for plastics, in addition to the above-described fatty acids, higher alcohols, fatty acid esters prepared from monobasic fatty acids having 12 to 20 carbon atoms and monohydric or polyhydric alcohols having 3 to 20 carbon atoms such as butyl stearate and sorbitan oleate, mineral oils, animal and vegetable oils, and low olefin polymers. The addition amount of the lubricating agents can be arbitrarily determined according to conventionally known techniques.

In the method for producing the magnetic recording medium of the present invention, the above-described ferromagnetic powder having a pH of at least 7, at least one member selected from the group consisting of the aromatic phosphoric acid, the aromatic phosphonic acid, the aromatic sulfonic acid or derivatives thereof, the vinyl chloride copolymer having the epoxy group and the hydroxyl group attached to an alkyl chain group, and a solvent are dispersed by kneading.

There is no particular restriction on the solvents used in kneading, and solvents usually employed for preparation of magnetic coatings such as methyl ethyl ketone, butyl acetate, methyl isobutyl ketone, toluene, cyclohexanone and tetrahydrofuran can be used.

Methods for kneading are also not particularly limited, and the order of adding the components can be properly established.

After the above-described dispersion by kneading, the above-described additives can be added.

In addition, detergent-dispersants, viscosity index improvers, pour point depressants and antifoaming agents may also be added.

Conventional kneading machines can be used for preparation of the magnetic coatings. Examples of such kneading machines include two-roll mills, three-roll mills, ball mills, pebble mills, Trommel, sand grinders, Szegvari attritors, high-speed impeller dispersing devices, high-speed stone mills, high-speed impact mills, dispers, kneaders, high-speed mixers, homogenizers and ultrasonic dispersing devices.

The viscosity of the magnetic coatings thus prepared is usually within the range of 60 to 200 ps (poise).

Although it is possible to apply the magnetic coating directly to the above-described non-magnetic support, it is also possible to apply the magnetic coating to the non-magnetic support through an adhesive layer or to the non-magnetic support which has been physically treated (for example, by a corona discharge treatment or an electron beam irradiation treatment).

Examples of methods for applying the magnetic coating to the non-magnetic support include air doctor coating, blade coating, rod coating, extrusion coating, air knife coating, squeeze coating, impregnation coating, reverse roll coating, transfer roll coating, gravure coating, kiss coating, cast coating, spray coating and spin coating. Other conventional coating methods other than these methods can also be used. A simultaneous multilayer coating method (wet-on-wet coating method) may be employed.

It is preferred that the magnetic coating is applied so that the final thickness of the magnetic layer of the magnetic recording medium is 0.1 to 10 μm.

In general, the coated layer thus applied was subjected to a magnetic field orientation treatment in an undried state to orient the ferromagnetic powder contained in the magnetic layer. The magnetic field orientation treatment can be conducted by conventional methods.

Thereafter, the coated layer is subjected to a drying step to dry the coated layer, thereby forming the magnetic layer. The drying step is usually carried out by heating the coated layer at 50 to 120° C. The heating time is generally 2 seconds to 5 minutes.

After drying, the magnetic layer is usually subjected to a surface smoothing treatment.

The surface smoothing treatment can be performed by a calender treatment. It is preferred that this calender treatment comprises a step in which heating and pressurizing are carried out using at least a pair (two steps) of rigid rolls, and preferably at least three steps thereof. As the above-described rigid rolls, for example, metal rolls are used which have a center line surface roughness (Ra: cutoff value, 0.25 mm) of about 20 nm or less, and more preferably of about 10 nm. Examples of the above-described rigid rolls include various hard chrome-plated or ceramic-coated steel rolls and rolls whose surfaces are formed of super-hard alloy. A step using a combined roll unit of a rigid roll and an elastic roll, which is used in the normal calender treatment, may be added before and/or after the step using at least a pair of rigid rolls.

The above-described calender treatment is preferably carried out at a temperature of 50° to 110° C. under a line pressure of 50 to 1,000 kg/cm, preferably of 50 to 350 kg/cm, and a line speed of 20 to 300 m/min.

After the calender treatment has been conducted as described for above, heat treatment is carried out at 50° to 90° C. within 30 hours, preferably for 12 to 24 hours. The "heat treatment" as used herein means a step of maintaining the calendered roll or sheet under the heating atmosphere to accelerate the hardening reaction of polyisocyanate and methane. In the present invention, the above-described vinyl chloride copolymer is used as the binder, and the aromatic phosphoric acid, aromatic phosphonic acid, aromatic sulfonic acid or a derivative thereof is added, so that the hardening reaction is promoted. Consequently, the time required for heat treatment is considerably shortened as compared to prior-art methods.

This heat treatment is carried out by winding the calender-treated magnetic recording medium on a heat-resistant core roll and heating the wound magnetic recording medium at a temperature of 50° to 90° C. together with the roll. If the heat-treating temperature exceeds 90° C., the base is deformed, whereas if it is lower than 50° C., the magnetic recording medium becomes insufficient in durability at operational high temperatures (40° C. to 50° C.).

The surface of the non-magnetic support on the side on which the magnetic layer is not formed may be provided with a conventional back layer. The back layer is formed of carbon black and a binder in which particles of inorganic filler having a Mohs' hardness of at least 5 are dispersed, and is a thin film layer having a thickness of 1.0 µm or less.

As explained above, in the present invention, the magnetic layer contains the ferromagnetic powder having a pH of at least 7 and at least one member selected from the group consisting of the aromatic phosphoric acid, the aromatic phosphonic acid, the aromatic sulfonic acid or a derivative thereof, and the vinyl chloride copolymer having the epoxy group and the hydroxyl group attached to an alkyl chain group, is used in combination therewith, whereby the dispersibility of the ferromagnetic powder is improved to enhance the C/N. Further, the formation of a network structure in the binder contained in the magnetic layer is promoted, whereby the mechanical characteristics of the magnetic layer is improved, and hardening proceeds to completion whereby the clogging is reduced even under conditions of high temperature and high humidity and the still durability is substantially improved. At the same time, the jitter property is also improved in the present invention.

The magnetic layer formed on the non-magnetic support is calender treated, followed by heat treatment to achieve more efficient and complete hardening, which, in turn, results in an remarkable improvement in durability under the circumstances of high temperature and high humidity. Moreover, the toughness of the magnetic layer is particularly improved by the optional combined use of the polyurethane having a glass transition temperature (Tg) of 25° to 65° C. with the above binder components.

If ferromagnetic powders having a pH of less than 7 are used, the powders are poorly dispersed which results in a decrease in C/N. If the conventional dispersing agents are used without using the aromatic phosphoric acids, aromatic phosphonic acids, aromatic sulfonic acids or derivatives thereof, the ferromagnetic powders are poorly dispersed. In particular, when the aromatic phosphonic acids and the like dispersing agents are not used, the C/N is significantly reduced. If the vinyl chloride copolymer does not have the epoxy group or the -OH group and attached to an alkyl chain group, the durability is poor. In the present invention, the above-described significant effects are handled by combining all of the above features of the present invention.

The present invention will be described in more detail with reference to the following Examples and Comparative Examples, in which all parts are by weight, unless otherwise specified.

EXAMPLES

A magnetic coating solution was prepared with the following formulation:

| Basic Formulation (corresponding to Sample No. 4 described hereinafter) | |
|---|---|
| Ferromagnetic powder (pH: 9.5, Fe—Ni, (Ni 0.7 atom % vs. Fe) sintering inhibitor: Al, $\sigma_s$: 125 emu/g, SSA: 55 m$^2$/g) | 100 parts |
| Vinyl chloride copolymer. (Pn: 350, containing —SO$_3$Na, epoxy group: 8.0 × 10$^{-4}$ eq/g, —OH group: 4.0 × 10$^{-4}$ eq/g) | 12 parts |
| Polyurethane (Mw: 45,000, containing —SO$_3$Na) | 8 parts |
| Isocyanate (Coronate L) | 5 parts |
| Carbon black (average particle size: 80 µm) | 1 part |
| α-Alumina (average particle size: 0.3 µm) | 8 parts |
| Stearic acid | 0.5 part |
| Butyl stearate | 1.5 parts |
| Methyl ethyl ketone/anone (1/1) | 200 parts |
| Phenylphosphonic acid | 2 parts |

Using the magnetic coating thus prepared, a magnetic medium was manufactured by the following method.

Manufacturing Method (Basic)

The ferromagnetic powder, phenylphosphonic acid, the vinyl chloride copolymer, the polyurethane resin, carbon black, α-alumina and the solvent were kneaded with a pressure kneader, and then, the solvent was further added thereto, followed by dispersion by using a ball mill for 20 hours. Then, stearic acid, butyl stearate, the isocyanate and the solvent were added thereto to prepare the coating solution. The resulting coating solution was applied to a polyethylene terephthalate base (having a thickness of 10 µm) to form a coated layer having a thickness of 3 µm, and then, orientation was conducted by a cobalt magnet (4,000 G), followed by drying. Then, the resulting product was treated under a line pressure of 250 kg/cm at 80° C. with a super calender device comprising elastic nylon rolls [Young's modulus: 400 kg/mm$^2$, surface roughness Ra: 10 nm (cutoff: 0.25 mm)] which is formed by wrapping a nylon layer round a metal core to a thickness of about 10 nm and chrome-plated metal rolls [Young's modulus: 21,000 kg/mm², Ra: 10 nm (cutoff: 0.25 mm)], the elastic rolls and the metal rolls being alternately and perpendicularly piled 5 high.

Heat treatment was thereafter conducted under the conditions described in Table 1 set forth hereinafter, followed by slitting to a width of 8 mm to produce an 8-mm tape.

Magnetic materials whose pH was adjusted under the following conditions were prepared to use as the magnetic materials:

| Magnetic Material | Treating Condition |
|---|---|
| A | Gas-phase gradual oxidation, Al |
| B | Gas-phase gradual oxidation, Si |
| C | Liquid-phase gradual oxidation, Si |
| D | Liquid-phase gradual oxidation, Al |
| E | Liquid-phase gradual oxidation, Al + alkali treatment |

Varying the kinds of magnetic materials, dispersing agents and vinyl chloride copolymers and the length of heat-treating time, magnetic recording media were produced. For the samples of these magnetic recording media, their characteristics were measured by the following evaluating methods. The results measured are shown in Table 1.

In the vinyl chloride copolymer used in Comparative Sample No. 17, the —OH groups are directly attached to the main chain.

Evaluation Methods (1) C/N Ratio

Using a commercial 8-mm video tape recorder (FUJIX 8 manufactured by Fuji Photo Film Co., Ltd.), a 5-MHz signal was recorded on a tape, and the noise generated at 4 MHz when this signal was reproduced was measured with a spectrum analyzer. The ratio of the reproduced signal to this noise was determined.

(2) Clogging

Using the video tape recorder (FUJIX 8), P6-120 (108 m) was run over the entire length at 40° C. at 80% RH, and the number of passes until no signal was produced was counted.

(3) Still Properties

Each video tape was reproduced at 40° C. at 80% RH by using the video tape recorder (FUJIX 8) in the still mode, and the time required for the S/N of the picture to decrease to 6 dB was measured.

(4) Jitter

The jitter value of each video tape was measured with a jitter meter (MK-611A, manufactured by Meguro Denpa Kabushiki Kaisha).

TABLE 1

| Sample No. | Magnetic Material (pH) | Dispersing Agent Kind | Dispersing Agent Amount | Vinyl Chloride Copolymer Epoxy Amount ($\times 10^{-4}$ eq/g) | Vinyl Chloride Copolymer —OH Amount ($\times 10^{-4}$ eq/g) |
|---|---|---|---|---|---|
| 1 (Comparative Example) | C (6.5) | PPA | 5.0% | 8.0 | 4.0 |
| 2 (Example) | D (7.5) | PPA | 2.0% | 8.0 | 4.0 |
| 3 (Example) | B (8.5) | PPA | 3.5% | 8.0 | 4.0 |
| 4 (Example) | A (9.5) | PPA | 3.0% | 8.0 | 4.0 |
| 5 (Example) | A (10.0) | PPA | 1.0% | 8.0 | 4.0 |
| 6 (Example) | E (13.0) | PPA | 3.5% | 8.0 | 4.0 |
| 7 (Example) | A (9.5) | Phenyl phosphoric acid | 3.0% | 8.0 | 4.0 |
| 8 (Example) | A (9.5) | Benzene-sulfonic acid | 3.0% | 8.0 | 4.0 |
| 9 (Example) | A (9.5) | p-Nitro-benzene-sulfonic acid | 3.0% | 8.0 | 4.0 |
| 10 (Comparative Example) | A (9.5) | Maleic acid | 3.0% | 8.0 | 4.0 |
| 11 (Comparative Example) | A (9.5) | Malonic acid | 3.0% | 8.0 | 4.0 |
| 12 (Comparative Example) | A (9.5) | none | — | 8.0 | 4.0 |
| 13 (Example) | A (9.5) | PPA | 3.0% | 14.0 | 0.5 |
| 14 (Example) | A (9.5) | PPA | 3.0% | 8.0 | 8.0 |
| 15 (Example) | A (9.5) | PPA | 3.0% | 4.0 | 6.0 |
| 16 (Comparative | A (9.5) | PPA | 3.0% | None | 4.0 |

TABLE 1-continued

| Example) | | | | | |
|---|---|---|---|---|---|
| 17 (Comparative Example) | A (9.5) | PPA | 3.0% | 8.0 | None |
| 18 (Comparative Example) | A (9.5) | PPA | 3.0% | 8.0 | 4.0 |
| 19 (Example) | A (9.5) | PPA | 3.0% | 8.0 | 4.0 |
| 20 (Example) | A (9.5) | PPA | 3.0% | 8.0 | 4.0 |
| 21 (Example) | A (9.5) | PPA | 3.0% | 8.0 | 4.0 |
| 22 (Example) | A (9.5) | PPA | 3.0% | 8.0 | 4.0 |
| 23 (Comparative Example) | C (6.5) | none | — | 8.0 | 4.0 |

| Sample No. | Polyurethane Tg (°C.) | Heat Treatment Temp. (°C.) | Heat Treatment Time (hr) | C/N (dB) | Clogging (pass) | Still (hr) | Jitter (μsec) |
|---|---|---|---|---|---|---|---|
| 1 (Comparative Example) | 38 | 70 | 24 | −0.5 | 25 | 20 min | 0.15 |
| 2 (Example) | 38 | 70 | 24 | 2.8 | 100 or more | 10 or more | 0.10 |
| 3 (Example) | 38 | 50 | 24 | 2.4 | 100 or more | 10 or more | 0.12 |
| 4 (Example) | 38 | 50 | 24 | 3.3 | 100 or more | 10 or more | 0.09 |
| 5 (Example) | 38 | 50 | 24 | 3.5 | 100 or more | 10 or more | 0.08 |
| 6 (Example) | 38 | 50 | 24 | 2.9 | 100 or more | 10 or more | 0.12 |
| 7 (Example) | 38 | 70 | 24 | 3.2 | 100 or more | 10 or more | 0.10 |
| 8 (Example) | 38 | 70 | 24 | 2.5 | 100 or more | 10 or more | 0.07 |
| 9 (Example) | 38 | 70 | 24 | 2.9 | 100 or more | 10 or more | 0.06 |
| 10 (Comparative Example) | 38 | 70 | 24 | 0.8 | 55 | 1.5 | 0.3 |
| 11 (Comparative Example) | 38 | 70 | 24 | 0.6 | 70 | 2.0 | 0.6 |
| 12 (Comparative Example) | 38 | 70 | 24 | 0 | 50 | 10 min | 0.4 |
| 13 (Example) | 38 | 70 | 24 | 2.2 | 95 | 5.0 | 0.11 |
| 14 (Example) | 38 | 70 | 24 | 3.0 | 100 or more | 10 or more | 0.10 |
| 15 (Example) | 38 | 70 | 24 | 3.1 | 100 or more | 10 or more | 0.09 |
| 16 (Comparative Example) | 38 | 90 | 48 | 2.7 | 28 | 2.0 | 0.13 |
| 17 (Comparative Example) | 38 | 90 | 48 | 3.2 | 20 | 50 min | 0.08 |
| 18 (Comparative Example) | 38 | 90 | 48 | 2.8 | 30 | 1.5 | 0.13 |
| 19 (Example) | 18 | 90 | 48 | 4.0 | 45 | 30 min | 0.50 |
| 20 (Example) | 25 | 70 | 24 | 3.6 | 100 or more | 10 or more | 0.14 |
| 21 (Example) | 65 | 70 | 24 | 2.3 | 100 or more | 10 or more | 0.08 |
| 22 (Example) | 85 | 50 | 24 | 0.8 | 83 | 20 | 0.09 |
| 23 (Comparative Example) | 35 | 90 | 24 | 1.8 | 47 | 1.5 | 0.13 |

Note)
PPA: the abbreviation of phenylphosphonic acid

According to the above measured results, in Comparative Sample No. 1 in which the magnetic material has a pH of lower than 7, the adsorption of the dispersing agent is unsatisfactory, so that the ferromagnetic powder is poorly dispersed and clogging readily occurs and also C/N is lowered as a result. The epoxy groups and the —OH groups react with free phenylphosphonic acid to increase the viscosity, whereby the magnetic layer becomes brittle and the durability is poor.

Sample Nos. 2 to 9 in which the magnetic materials have a pH of at least 7 and the aromatic phosphoric acids and aromatic phosphonic acids are used as the dispersing agents are satisfactory in durability, in electromagnetic characteristics and also in jitter (the jitter of 0.2 or more is substantially harmful).

In Comparative Sample Nos. 10 and 11 in which compounds other than aromatic phosphoric acids, aromatic phosphonic acids or aromatic sulfonic acids are used as the dispersing agents, the magnetic materials can be easily dropped out to cause clogging due to the week adsorbability of the dispersing agents. For this reason, the ferromagnetic powders are also poorly dispersed which leads to a lower C/N. Further, the Samples 10 and 11 have no effect of promoting the reaction of the epoxy groups with the OH groups. Hardening is therefore insufficient and the durability is also insufficient. Moreover, the lubricating agents are adsorbed by the magnetic materials, so that they do not act effectively.

Sample Nos. 12 and 23 are basic comparative examples demonstrating the importance of the dispersing agents of the present invention.

As to Sample No. 13, when the epoxy groups are contained in large amounts and the —OH groups are contained in small amounts, the durability is somewhat inferior.

As to Sample Nos. 14 and 15, the advantages of the present invention are demonstrated where the epoxy groups and the —OH groups are contained in amounts of the present invention.

Comparative Sample No. 16 (no epoxy group) and Comparative Sample No. 17 (no —OH group) have inferior clogging property.

In Comparative Sample No. 18, the —OH groups are attached directly to the main chain of the copolymer and inferior clogging property was shown.

Comparative Sample Nos. 16 to 18 are deteriorated in reactivity and in durability. The durability is not improved even if heat treatment is conducted at elevated temperatures for long periods of time.

As to Sample No. 19, the Tg of the polyurethane is so low that the durability is poor even if heat treatment is conducted at elevated temperatures for long periods of time, and the jitter is also unsatisfactory.

In contrast, in Sample Nos. 20 and 21, the Tg of the polyurethane and the heat-treating time are suitable, and therefore, the characteristics such as durability are satisfactory.

In Sample No. 22, the Tg of the polyurethane is so high that the magnetic layer becomes brittle, and the durability is all the worse even for relatively gentle heat treatment.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support and at least one magnetic layer formed thereon, said magnetic layer having a ferromagnetic powder dispersed in a binder, wherein said magnetic layer contains at least one member selected from the group consisting of an aromatic phosphoric acid or a derivative thereof, an aromatic phosphonic acid or a derivative thereof, and an aromatic sulfonic acid or a derivative thereof, and wherein said ferromagnetic powder has a pH of at least 7, and said binder is a vinyl chloride copolymer having an epoxy group and a hydroxyl group attached to an alkyl chain group.

2. A magnetic recording medium as in claim 1, wherein said binder further contains a polyurethane having a glass transition temperature (Tg) of from 25 to 65° C.

3. A magnetic recording medium as in claim 1, wherein the ferromagnetic powder has a specific surface area (SSA) of 40 m²/g or more and a saturation magnetization ($\sigma_s$) of 115 emu/g or more.

4. A magnetic recording medium as in claim 1, wherein the aromatic phosphoric acid, the aromatic phosphonic acid, the aromatic sulfonic acid or the derivatives thereof is represented by the following general formulae:

wherein A represents an aromatic ring; X represents a hydrogen atom, an alkyl group, a nitro group or a halogen atom; and M represents a hydrogen atom, an alkali metal or an alkaline earth metal.

5. A magnetic recording medium as in claim 1, wherein the aromatic phosphoric acid, aromatic phosphonic acid, aromatic sulfonic acid or derivatives thereof is contained in the magnetic layer in an amount of 0.1 to 10.0% by weight based on the ferromagnetic powder.

6. A magnetic recording medium as in claim 1, wherein the vinyl chloride copolymer has an average degree of polymerization (Pn) of 200 to 500.

7. A magnetic recording medium as in claim 1, wherein the epoxy group is attached to an alkyl chain group.

8. A magnetic recording medium as in claim 1, wherein the alkyl chain group has 2 o 30 carbon atoms.

9. A magnetic recording medium as in claim 1, wherein the amount of the epoxy groups contained in the vinyl chloride copolymer is $1 \times 10^{-5}$ to $5 \times 10^{-3}$ eq/g.

10. A magnetic recording medium as in claim 1, wherein the amount of —OH groups contained in the vinyl chloride copolymer is $1 \times 10^{-5}$ to $5 \times 10^{-3}$ eq/g.

11. A magnetic recording medium as in claim 1, wherein the binder is used in a ratio to the ferromagnetic powder of 10 to 30 parts by weight binder per 100 parts by weight of ferromagnetic powder.

12. A magnetic recording medium as in claim 1, wherein the magnetic layer has a thickness of 0.1 to 10 μm.

13. A method for producing a magnetic recording medium which comprises the steps of kneading and dispersing a ferromagnetic powder having a pH of at least 7, at least one member selected from the group consisting of an aromatic phosphoric acid or a derivative thereof, an aromatic phosphonic acid or a derivative thereof, and an aromatic sulfonic acid or a derivative thereof, and a vinyl chloride copolymer having an epoxy group and a hydroxyl group attached to an alkyl chain group, together with a solvent, and then optionally adding at least one additive thereto, and mixing to prepare a magnetic coating, applying the resulting magnetic coating to a non-magnetic support, drying the coating applied to the non-magnetic support, and thereafter subjecting the coating to a calender treatment, and then heat treating at 50° to 90° C. within 30 hours.

14. A method of producing a magnetic recording medium as in claim 13, wherein the additive is selected from the group consisting of carbon black, fillers, abrasive materials, dispersing agents, antistatic agents, lubricating agents, or combinations thereof.

15. A method of producing a magnetic recording medium as in claim 13, wherein the vinyl chloride copolymer is produced by copolymerizing a vinyl chloride monomer with an epoxy group-containing monomer and a hydroxyl group containing monomer.

* * * * *